US 12,045,964 B2

United States Patent
Zak et al.

(10) Patent No.: US 12,045,964 B2
(45) Date of Patent: Jul. 23, 2024

(54) EYEWEAR DISTORTION CORRECTION

(71) Applicant: Snap Inc., Santa Monica, CA (US)

(72) Inventors: Eyal Zak, Megiddo (IL); Guy Melamed, Haifa (IL)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/715,732

(22) Filed: Apr. 7, 2022

(65) Prior Publication Data

US 2022/0230284 A1 Jul. 21, 2022

Related U.S. Application Data

(63) Continuation of application No. 17/039,334, filed on Sep. 30, 2020, now Pat. No. 11,334,972.

(51) Int. Cl.
| | |
|---|---|
| *G06T 5/80* | (2024.01) |
| *G06F 18/00* | (2023.01) |
| *G06T 3/40* | (2006.01) |
| *G06T 7/13* | (2017.01) |
| *G06T 11/00* | (2006.01) |
| *G06V 40/16* | (2022.01) |

(52) U.S. Cl.
CPC ................ *G06T 5/80* (2024.01); *G06F 18/00* (2023.01); *G06T 3/40* (2013.01); *G06T 7/13* (2017.01); *G06T 11/00* (2013.01); *G06V 40/161* (2022.01); *G06T 2207/10016* (2013.01); *G06T 2207/20081* (2013.01); *G06T 2207/30201* (2013.01)

(58) Field of Classification Search
CPC ........ G06T 7/13; G06T 5/006; G06K 9/00228
See application file for complete search history.

(56) References Cited

U.S. PATENT DOCUMENTS

| | | | |
|---|---|---|---|
| 6,142,628 | A | 11/2000 | Saigo |
| 11,334,972 | B2 | 5/2022 | Zak et al. |

(Continued)

FOREIGN PATENT DOCUMENTS

| | | |
|---|---|---|
| JP | 2008250407 A | 10/2008 |
| JP | 2015064768 A | 4/2015 |
| JP | 2015118617 A | 6/2015 |

OTHER PUBLICATIONS

Hu Bingwen et al: "Unsupervised Eyeglasses Removal in the Wild", IEEE Transactions on Cybernetics, IEEE, Piscataway, NJ, USA, vol. 51, No. 9, Sep. 2021, pp. 4373-4385.

(Continued)

*Primary Examiner* — Matthew Salvucci
(74) *Attorney, Agent, or Firm* — Culhane PLLC; Stephen J. Weed

(57) ABSTRACT

Systems, methods, and non-transitory computer readable mediums including processes to correct for distortion in images introduced by eyewear (i.e., where the facial region surrounding the eye has a boundary that doesn't match the boundary of an uncovered facial region). The correction includes segmenting images to detect eyewear covered facial regions and facial regions not covered by the eyewear and altering the covered facial regions to match the covered facial boundary to the uncovered facial boundary. Alterations include processing using a machine learning model, applying anti-refraction algorithms, scaling the covered facial region to match boundaries of the uncovered facial region, or a combination thereof.

20 Claims, 12 Drawing Sheets

(56) References Cited

U.S. PATENT DOCUMENTS

| | | |
|---|---|---|
| 2015/0029323 A1 | 1/2015 | Nagao et al. |
| 2015/0379348 A1 | 12/2015 | Whritenor et al. |
| 2018/0005448 A1* | 1/2018 | Choukroun ............... G06T 7/70 |
| 2019/0206028 A1 | 7/2019 | Tsuji |

OTHER PUBLICATIONS

International Search Report and Written Opinion for International Application No. PCT/US2021/051454, dated Dec. 8, 2022 (Aug. 12, 2022)—14 pages.

Photowalkpro: "Glasses Fix", Feb. 10, 2009 (Feb. 10, 2009), XP055866543, Retrieved from the Internet: URL: https://www.youtube.com/watch?v=7w1cxS5832Q.

Urthaler, Paul: "Glasses Detection and Segmentation from Face Portrait Images," Master's Thesis, Graz University of Technology, Institute for Computer Graphics and Vision, Graz, Austria, Dec. 2008, 79 pages.

\* cited by examiner

EYEWEAR DISTORTION CORRECTION

CROSS-REFERENCE TO RELATED APPLICATIONS

This application is a Continuation of U.S. patent application Ser. No. 17/039,334 filed on Sep. 30, 2020, the contents of which are incorporated fully herein by reference.

TECHNICAL FIELD

This disclosure relates to image processing and, more particularly, to processing images to correct for distortion introduced by eyewear.

BACKGROUND

Eyewear includes lenses acting as prisms to refract light in order to improve the vision of the wearer. The refraction introduces distortion that causes the wearer's eyes (and the surrounding regions covered by the lenses) to distort when viewed by another such that the wearer's eyes appear out of proportion to the rest of their head, which is not covered by the lenses. This distortion is also apparent in images of the wearer.

BRIEF DESCRIPTION OF THE DRAWINGS

The drawing figures depict one or more implementations, by way of example only, not by way of limitations. In the figures, like reference numerals refer to the same or similar elements with a letter designation added to differentiate between the same or similar elements. The letter designation may be dropped when the same or similar elements are referred to collectively or when referring to a non-specific one of the same or similar elements.

DETAILED DESCRIPTION

Figure 1A:
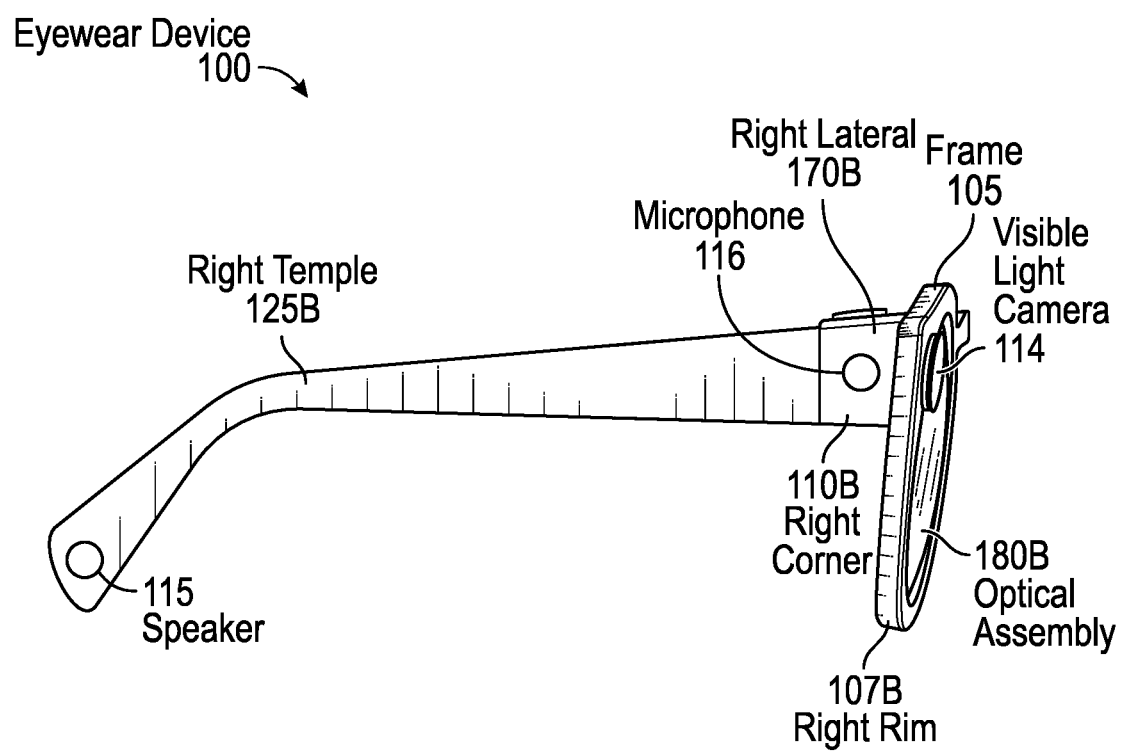
FIG. 1A is a side view of an example hardware configuration of an eyewear device, which includes a visible light camera on a corner and a speaker on a temple.

The following detailed description includes examples for correcting for distortion in images (still or video) introduced by eyewear (i.e., where the facial region surrounding the eye that is covered by an eyewear lens has a covered facial boundary that doesn't match an uncovered facial boundary of the uncovered facial region). The correction includes segmenting images to detect eyewear covered facial regions and facial regions not covered by the eyewear and altering the covered facial regions to match the covered facial boundary to the uncovered facial boundary. Alterations include processing using a machine learning model, applying anti-refraction algorithms, scaling the covered facial region to match boundaries of the uncovered facial region, or a combination thereof.

In the following detailed description, numerous specific details are set forth by way of examples in order to provide a thorough understanding of the relevant teachings. However, it should be apparent to those skilled in the art that the present teachings may be practiced without such details. In other instances, description of well-known methods, procedures, components, and circuitry are set forth at a relatively high-level, without detail, in order to avoid unnecessarily obscuring aspects of the present teachings.

The term "coupled" as used herein refers to any logical, optical, physical or electrical connection, link or the like by which electrical signals produced or supplied by one system element are imparted to another coupled element. Unless described otherwise, coupled elements or devices are not necessarily directly connected to one another and may be separated by intermediate components, elements or communication media that may modify, manipulate or carry the electrical signals. The term "on" means directly supported by an element or indirectly supported by the element through another element integrated into or supported by the element. As used herein, the term "about" means ±10% from the stated amount.

The orientations of the mobile devices, eyewear devices, associated components and any complete devices incorporating a camera such as shown in any of the drawings, are given by way of example only, for illustration and discussion purposes. In operation, for particular programming, devices may be oriented in any other direction suitable to the particular application, for example up, down, sideways, or any other orientation. Also, to the extent used herein, any directional term, such as front, rear, inward, outward, toward, left, right, lateral, longitudinal, up, down, upper, lower, top, bottom and side, are used by way of example only, and are not limiting as to direction or orientation of any camera or component of a camera constructed as otherwise described herein.

Objects, advantages and novel features of the examples will be set forth in part in the following description, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

Reference now is made in detail to examples illustrated in the accompanying drawings and discussed below.

FIG. 1A depicts an example hardware configuration of a mobile device in the form of an eyewear device 100 for gathering and, optionally, processing images. The mobile device may take other forms such as a mobile phone or a tablet. Additionally, the eyewear device 100 can take other forms and may incorporate other types of frameworks, for example, a headgear, a headset, or a helmet. The eyewear device 100 includes at least one visible light camera 114 on a corner 110B for capturing images in a viewing area (e.g., field of view). The illustrated eyewear device 100 also includes a speaker 115 and a microphone 116.

The visible light camera 114 is sensitive to the visible light range wavelength. As shown in the example, the visible light camera 114 has a front facing field of view from the perspective of a wearer that is configured to capture images of a scene being viewed thought an optical assembly 180B. Examples of such a visible light camera 114 include a high-resolution complementary metal-oxide-semiconductor (CMOS) image sensor and a video graphic array (VGA) camera, such as 640p (e.g., 640×480 pixels for a total of 0.3 megapixels), 720p, or 1080p (or greater). The eyewear device 100 captures image sensor data from the visible light camera 114, and optionally other data such as geolocation data and audio data (via microphone 116), digitizes the data using one or more processors, and stores the digitized data in a memory. The term "field of view" describes the viewing area which the user of a mobile device can see with his or her eyes through optical assemblies 180 or on a display of a mobile device presenting information captured with the visible light camera 114.

Visible light camera 114 may be coupled to an image processor (element 312 of FIG. 3A) for digital processing and adding of timestamp and location coordinates corresponding to when and where an image of a scene is captured. Image processor 312 includes circuitry to receive signals from the visible light camera 114 and process those signals from the visible light camera 114 into a format suitable for storage in memory (element 334 of FIG. 3A). The timestamp can be added by the image processor 312 or other processor, which controls operation of the visible light camera 114. The image processor 312 may additionally add the location coordinates, e.g., received from a global positioning system (element 331 of FIG. 3A).

The microphone 116 may be coupled to an audio processor (not shown) for digital processing and adding a timestamp indicating when audio is captured. The audio processor includes circuitry to receive signals from the microphone 116 (or from memory) and process those signals into a format suitable for storage in the memory 334 or presentation by speaker 115. The timestamp can be added by the audio processor or other processor, which controls operation of the speaker 115 and the microphone 116.

Figure 1B:
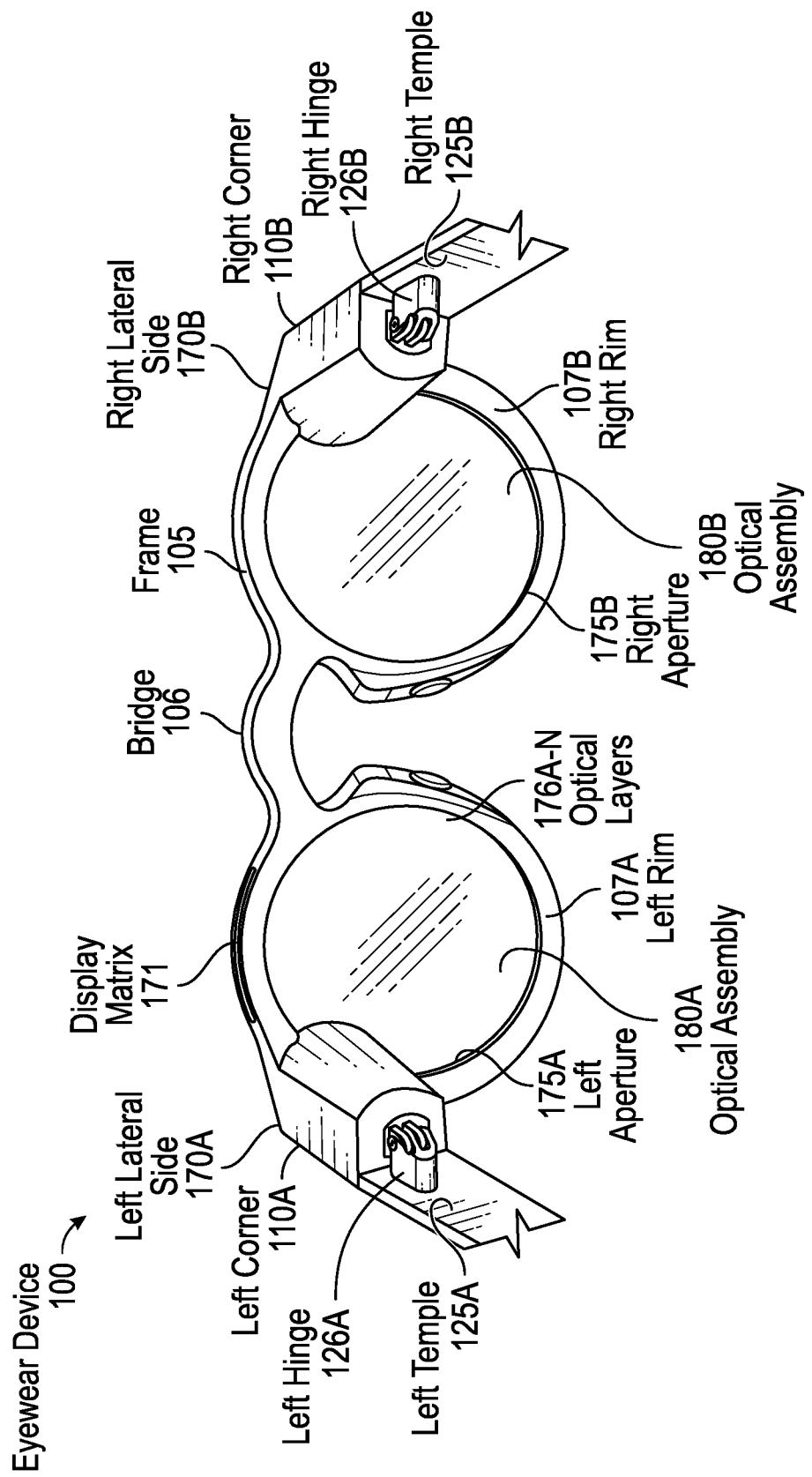
FIGS. 1B and 1C are rear views of example hardware configurations of the eyewear device of FIG. 1A, including two different types of image displays.
Figure 1C:
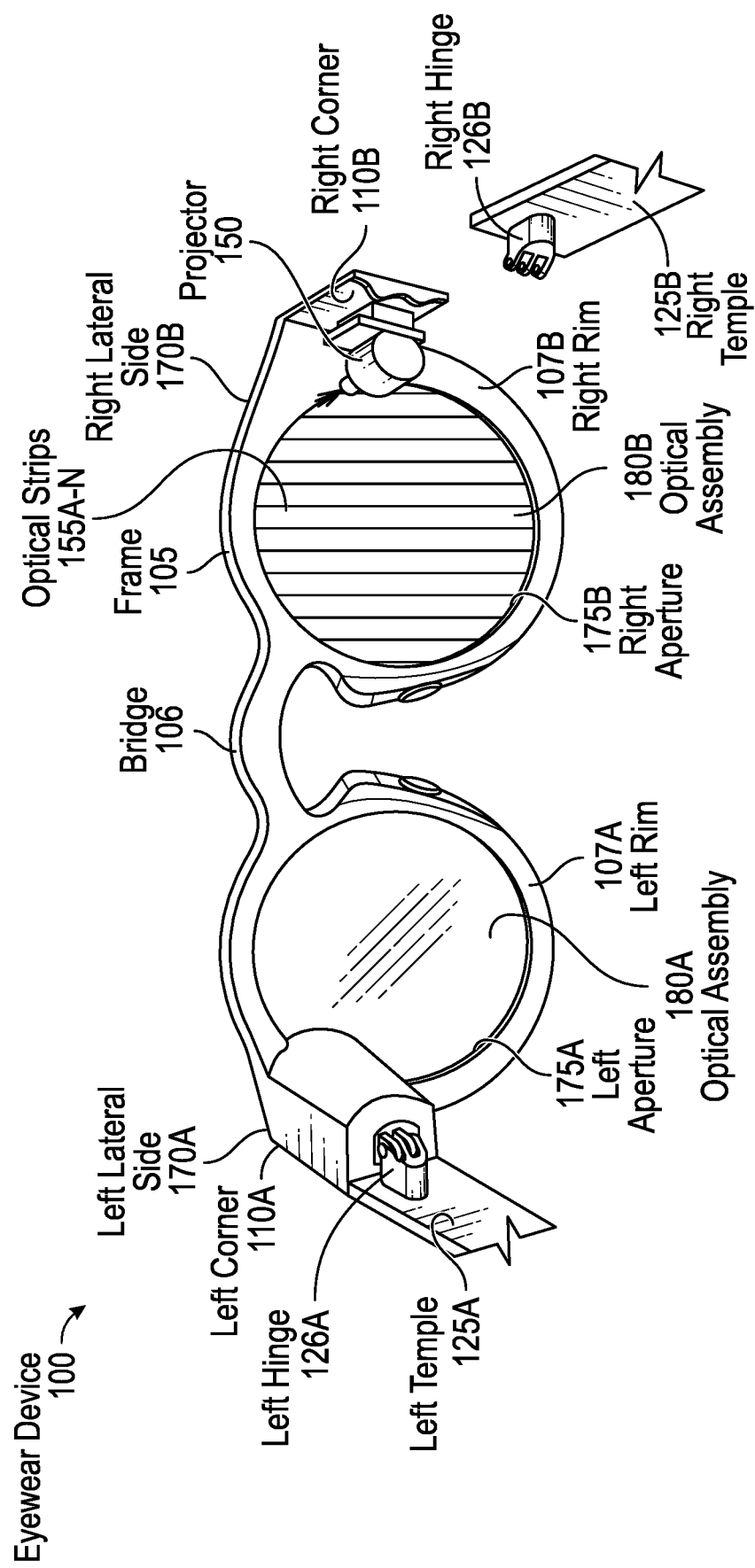

As shown in FIGS. 1A, 1B, and 1C, the eyewear device 100 includes a frame 105 having a left rim 107A connected to a right rim 107B via a bridge 106 adapted for a nose of the user. The left and right rims 107A-B include respective apertures 175A-B that hold a respective optical assembly 180A-B. Left and right temples 125A-B extend from respective lateral sides 170A-B of the frame 105, for example, via respective left and right corners 110A-B. Each temple 125A-B is connected to the frame 105 via a respective hinge 126A-B. A substrate or materials forming the frame 105, corners 110, and temples 125A-B can include plastic, acetate, metal, or a combination thereof. The corners 110A-B can be integrated into or connected to the frame 105 or temples 125A-B.

Although shown as having two optical assemblies 180A-B, the eyewear device 100 can include other arrangements, such as a single assembly or three optical assemblies, or the optical assembly 180A-B may have a different arrangement depending on the application or intended user of the eyewear device 100.

In one example, such as depicted in FIG. 1B, each optical assembly 180A-B includes a display matrix 171 and an optical layer or layers 176A-N. The display matrix 171 may include a liquid crystal display (LCD), an organic light-emitting diode (OLED) display, or other such display. The optical layer or layers 176 may include lenses, optical coatings, prisms, mirrors, waveguides, optical strips, and other optical components in any combination. As used herein, the term lens is meant to cover transparent or translucent pieces of glass or plastic having curved or flat surfaces that cause light to converge/diverge or that cause little or no convergence or divergence.

The optical layers 176A-N can include a prism having a suitable size and configuration and including a first surface for receiving light from display matrix and a second surface for emitting light to the eye of the user. The prism of the optical layers 176A-N extends over all or at least a portion of the respective apertures 175A-B formed in the left and right rims 107A-B to permit the user to see the second surface of the prism when the eye of the user is viewing through the corresponding left and right rims 107A-B. The first surface of the prism of the optical layers 176A-N faces upwardly from the frame 105 and the display matrix overlies the prism so that photons and light emitted by the display matrix impinge the first surface. The prism is sized and shaped so that the light is refracted within the prism and is directed toward the eye of the user by the second surface of the prism of the optical layers 176A-N. In this regard, the second surface of the prism of the optical layers 176A-N can be convex to direct the light toward the center of the eye. The prism can optionally be sized and shaped to magnify the image projected by the display matrix 171, and the light that travels through the prism, so that the image viewed from the second surface is larger in one or more dimensions than the image emitted from the display matrix 171.

In another example, such as depicted in FIG. 1C, the image display device of optical assembly 180A-B includes a projection image display. The illustrated projection image display includes a laser projector 150 (e.g., a three-color laser projector using a scanning mirror or galvanometer) disposed adjacent one of the corners 110A-B of the eyewear device 100 and optical strips 155A-N spaced apart across the width of the lens of the optical assembly 180A-B or across a depth of the lens between the front surface and the rear surface of the lens.

As the photons projected by the laser projector 150 travel across the lens of the optical assemblies 180A and 180B, the photons encounter the optical strips 155A-N. When a particular photon encounters a particular optical strip, the photon is either redirected toward the user's eye, or it passes to the next optical strip. A combination of modulation of laser projector 150, and modulation of optical strips, control specific photons or beams of light. In an example, a processor controls optical strips 155A-N by initiating mechanical, acoustic, or electromagnetic signals.

In one example, the produced visible output on the optical assembly 180A-B of the eyewear device 100 includes an overlay image that overlays at least a portion of the field of view through the optical assemblies 180A-B. In one example, the optical assemblies 180A-B are see-through displays that present the overlay image as an overlay on a scene (or features within a scene) that the wearer is viewing through the lenses of the optical assembly. In another example the optical assemblies 180A-B are not see-through displays (e.g., are opaque displays) that present the overlay image by combining the overlay with real-time images captured by the cameras 114 of the eyewear device for presentation to the user on the displays.

As noted above, the eyewear device 100 is coupled to a processor and a memory, for example in the eyewear device 100 itself or another part of the system. Eyewear device 100 or the system can subsequently process images captured of the eye, for example, a coupled memory and processor in the system to process the captured images of the eye to track eye movement. Such processing of the captured images establishes a scanpath to identify movement of the user's eye. The scanpath includes the sequence or series of eye movements based on captured reflection variations of the eye. Eye movements are typically divided into such fixations and saccades—when the eye gaze pauses in a certain position, and when it moves to another position, respectively. The resulting series of fixations and saccades is called the scanpath. Smooth pursuit describes the eye following a moving object. Fixational eye movements include micro saccades: small, involuntary saccades that occur during attempted fixation. The scanpaths are then utilized to determine the field of view adjustment.

An eye direction database can be established during calibration. Since the known fixed position of the respective point of interests during calibration are known, that scanpath database can be used to establish similarities to the previously obtained calibration images. Because the known fixed position of the point of interest is known from the calibration image and is recorded in the eye direction database, the eyewear device 100 can determine where the eye of the user is looking by comparing currently captured images of the eye with the eye direction database. The calibration image(s) which most closely resembles the currently captured image can have the known fixed position of the point of interest utilized as a good approximation of the eye direction for the currently captured image.

Figure 2:
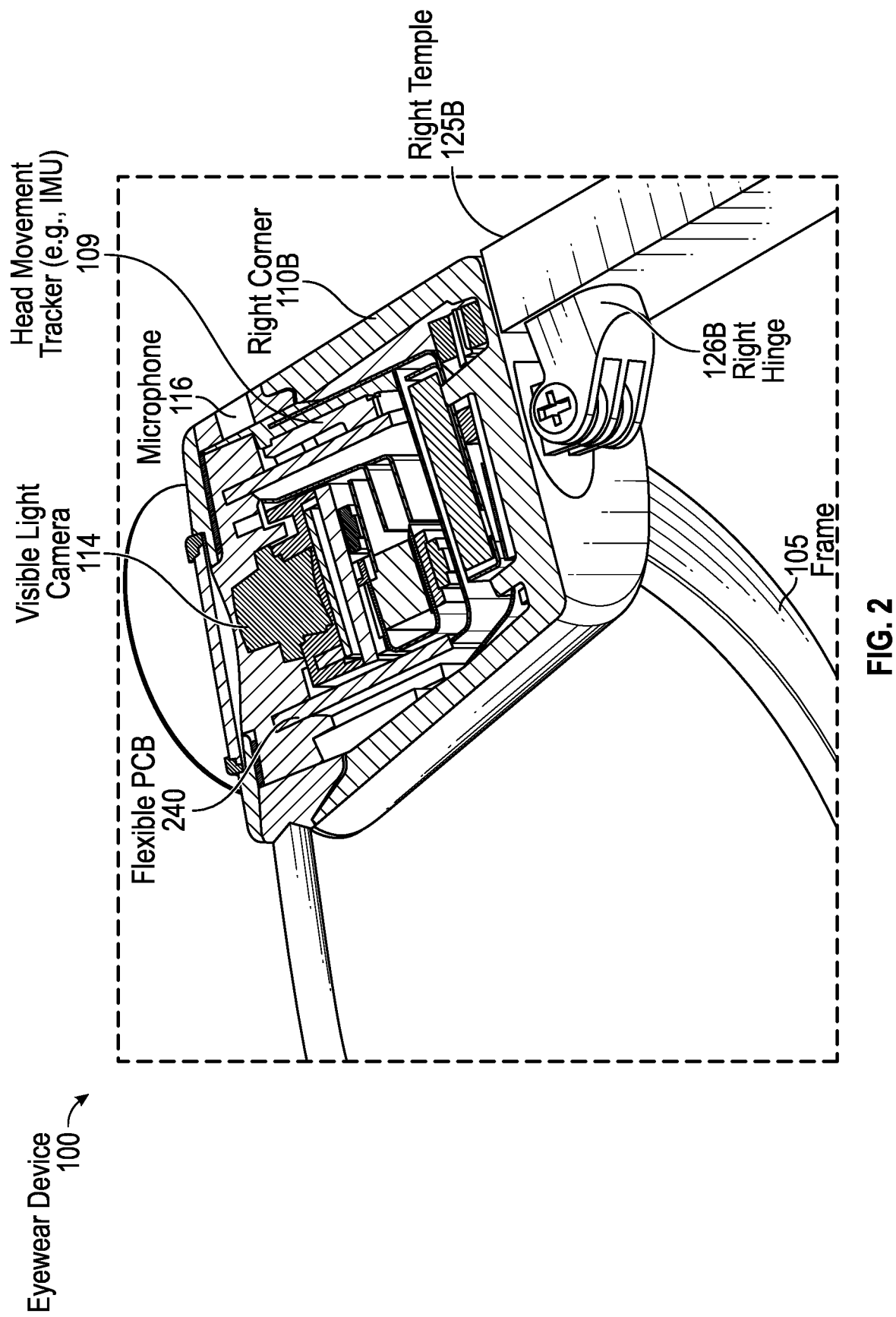
FIG. 2 is a top cross-sectional view of a corner of the eyewear device of FIG. 1A depicting the visible light camera, a head movement tracker, and a circuit board.

FIG. 2 is a top cross-sectional view of the corner of the eyewear device 100 of FIG. 1A depicting the right visible light camera 114, a head movement tracker 109, and a microphone 116. Construction and placement of a left visible light camera is substantially similar to the right visible light camera 114, except the connections and coupling are on the left lateral side 170A.

A right corner 110B includes a corner body and a corner cap, with the corner cap omitted in the cross-section of FIG. 2. As shown, the eyewear device 100 includes a circuit board, which may be a flexible printed circuit board (PCB) 240, having controller circuits for right visible light camera 114, microphone(s), low-power wireless circuitry (e.g., for wireless short range network communication via Bluetooth™), high-speed wireless circuitry (e.g., for wireless local area network communication via WiFi). The right hinge 126B connects the right corner 110B to a right temple 125C of the eyewear device 100. In some examples, components of the right visible light camera 114, the flexible PCB 140, or other electrical connectors or contacts may be located on the right temple 125C or the right hinge 126B.

The head movement tracker 109 includes, for example, an inertial measurement unit (IMU). An IMU is an electronic device that measures and reports a body's specific force, angular rate, and sometimes the magnetic field surrounding the body, using a combination of accelerometers and gyroscopes, sometimes also magnetometers. The IMU works by detecting linear acceleration using one or more accelerometers and rotational rate using one or more gyroscopes. Typical configurations of IMUs contain one accelerometer, gyro, and magnetometer per axis for each of the three axes: horizontal axis for left-right movement (X), vertical axis (Y) for top-bottom movement, and depth or distance axis for up-down movement (Z). The gyroscope detects the gravity vector. The magnetometer defines the rotation in the magnetic field (e.g., facing south, north, etc.) like a compass which generates a heading reference. The three accelerometers detect acceleration along the horizontal, vertical, and depth axis defined above, which can be defined relative to the ground, the eyewear device 100, or the user wearing the eyewear device 100.

Eyewear device 100 detects movement of the user of the eyewear device 100 by tracking, via the head movement tracker 109, the head movement of the head of the user. The head movement includes a variation of head direction on a horizontal axis, a vertical axis, or a combination thereof from the initial head direction during presentation of the initial displayed image on the image display. In one example, tracking, via the head movement tracker 109, the head movement of the head of the user includes measuring, via an inertial measurement unit, the initial head direction on the horizontal axis (e.g., X axis), the vertical axis (e.g., Y axis), or the combination thereof (e.g., transverse or diagonal movement). Tracking, via the head movement tracker 109, the movement of the head of the user further includes measuring, via the inertial measurement unit, a successive head direction on the horizontal axis, the vertical axis, or the combination thereof during presentation of the initial displayed image.

Figure 3A:
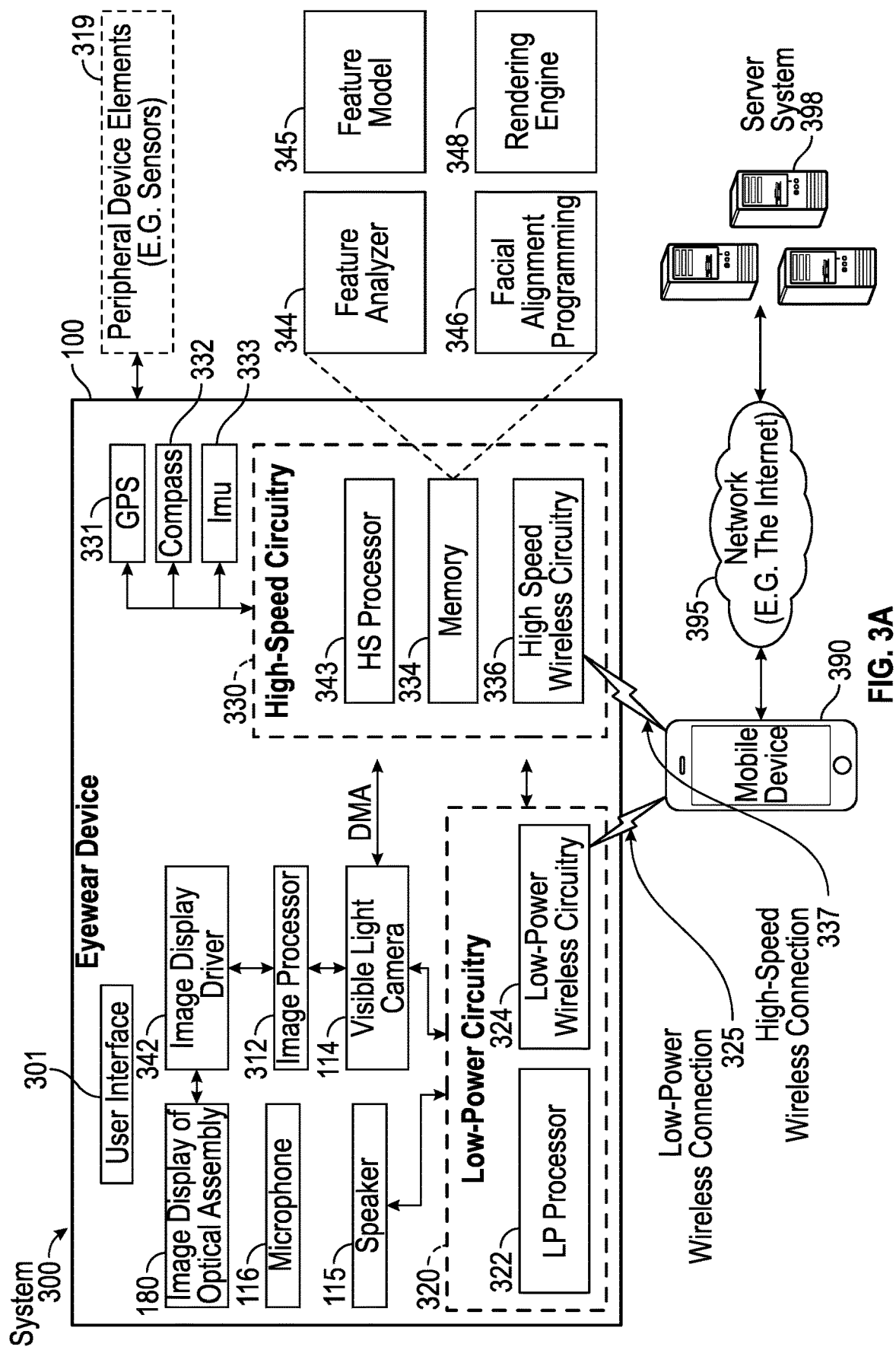
FIG. 3A is a high-level functional block diagram of an example image capture, processing, and display system including the eyewear device, a mobile device, and a server system connected via various networks.

FIG. 3A is a high-level functional block diagram of an example image capture, processing, and display system 300. The image capture, processing, and display system 300 includes a mobile device, which is the eyewear device 100 in the example. The mobile device can communicate via one or more wireless networks or wireless links with other mobile devices 390 or server systems 398. The image capture, processing, and display system 300 further includes the other mobile devices 390 and server systems 398. A mobile device 390 may be a smartphone, tablet, laptop computer, access point, or other such device capable of connecting with eyewear device 100 using, for example, a low-power wireless connection 325 and a high-speed wireless connection 337. The mobile device 390 is connected to the server system 398 via the network 395. The network 395 may include any combination of wired and wireless connections.

The eyewear device 100 includes and supports a visible light camera 114, a speaker 115, a microphone 116, a user interface 301, an image display of the optical assembly 180, image display driver 342, image processor 312, audio processor 313, low-power circuitry 320, and high-speed circuitry 330. The components shown in FIG. 3A for the eyewear device 100 are located on one or more circuit boards, for example a PCB or flexible PCB, in the temples. Alternatively, or additionally, the depicted components can be located in the corners, frames, hinges, or bridge of the eyewear device 100. Memory 334 includes feature analyzer 344, feature model 345, and facial alignment programming 346 to perform the functions described herein for image capture, processing, and display. Memory 334 additionally includes a rendering engine 348 for rendering overlay images on the displays 180A and 180B using image processor 312 and image display driver 342.

Feature analyzer 344 implements instructions to cause the eyewear device 100 to process objects and aspects identified from a scene viewed through the eyewear device 100. Feature model 345 is a machine learning model trained to identify objects (such as faces, eyeglasses, covered facial regions, uncovered facial regions, etc.) and aspects (such as movement, straight lines, curved lines, materials). Facial alignment programming 346 implements instructions to cause the eyewear device 100 to identify and correct for boundary mismatch between regions of a face covered by an eyewear lens and regions of the face not covered by the eyewear lens.

As shown in FIG. 3A, high-speed circuitry 330 includes high-speed processor 343, memory 334, and high-speed wireless circuitry 336. In an example, the image display driver 342 is operated by the high-speed processor 343 in order to drive the image display of the optical assembly 180. High-speed processor 343 may be any processor capable of managing high-speed communications and operation of any general computing system needed for eyewear device 100. High-speed processor 343 includes processing resources needed for managing high-speed data transfers on high-speed wireless connection 337 to a wireless local area network (WLAN) using high-speed wireless circuitry 336. In some examples, the high-speed processor 343 executes an operating system such as a LINUX operating system or other such operating system of the eyewear device 100 and the operating system is stored in memory 334 for execution. In addition to any other responsibilities, the high-speed processor 343 executes a software architecture for the eyewear device 100 to manage data transfers with high-speed wireless circuitry 336. In some examples, high-speed wireless circuitry 336 is configured to implement Institute of Electrical and Electronic Engineers (IEEE) 802.11 communication standards, also referred to herein as Wi-Fi. In other examples, high-speed wireless circuitry 336 implements other high-speed communications standards.

Low-power wireless circuitry 324 and the high-speed wireless circuitry 336 of the eyewear device 100 can include short range transceivers (Bluetooth™) and wireless wide, local, or wide area network transceivers (e.g., cellular or WiFi). Mobile device 390, including the transceivers communicating via the low-power wireless connection 325 and high-speed wireless connection 337, may be implemented using details of the architecture of the eyewear device 100, as can other elements of network 395.

Memory 334 includes a storage device capable of storing various data and applications, including, among other things, camera data generated by the visible light camera 114 and the image processor 312, as well as images generated for display by the image display driver 342 on the image display of the optical assembly 180 and audio data generated by the microphone 116 and the audio processor 313. While memory 334 is shown as integrated with high-speed circuitry 330, in other examples, memory 334 may be an independent standalone element of the eyewear device 100. In some examples, electrical routing lines may provide a connection through a chip that includes the high-speed processor 343 from the image processor 312/audio processor 313 or low-power processor 324 to the memory 334. In other examples, the high-speed processor 343 may manage addressing of memory 334 such that the low-power processor 324 will boot the high-speed processor 343 any time that a read or write operation involving memory 334 is needed.

Eyewear device 100 further includes a global positioning system 331, a compass 332, and an inertial measurement unit 333. GPS 331 is a receiver for use in a satellite-based radio navigation system that receives geolocation and time information from GPS satellites. Compass 332 provides direction relative to geographic cardinal directions (or points). IMU 333 is an electronic device that measures and reports a force, angular rate, orientation, or combination thereof using a combination of accelerometers, gyroscopes, and magnetometers.

Eyewear device 100 may connect with a host computer. For example, the eyewear device 100 may pair with the mobile device 390 via the high-speed wireless connection 337 or connected to the server system 398 via the network 395. In one example, eyewear device 100 captures, via the camera 114, image of a scene and sends the images to the host computer for forwarding to server system 398 for training feature model 364. In another example, the eyewear device 100 receives images and instructions from the host computer.

The eyewear device 100 further includes other output component and input components. The other output components include acoustic components (e.g., speakers 115), haptic components (e.g., a vibratory motor), and other signal generators. The input components of the eyewear device 100, the mobile device 390, and server system 398, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone 116), and the like.

Image capture, processing, and display system 300 may optionally include additional peripheral device elements 319. Such peripheral device elements 319 may include biometric sensors, additional sensors, or display elements integrated with eyewear device 100. For example, peripheral device elements 319 may include any I/O components including output components, motion components, position components, or any other such elements described herein.

For example, the biometric components of the image capture, processing, and display system 300 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 325 and 337 from the mobile device 390 via the low-power wireless circuitry 324 or high-speed wireless circuitry 336.

In one example, image processor 312 comprises a microprocessor integrated circuit (IC) customized for processing image sensor data from the visible light camera 114, along with volatile memory used by the microprocessor to operate. In order to reduce the amount of time that image processor 312 takes when powering on to processing data, a non-volatile read only memory (ROM) may be integrated on the IC with instructions for operating or booting the image processor 312. This ROM may be minimized to match a minimum size needed to provide basic functionality for gathering sensor data from visible light camera 114, such that no extra functionality that would cause delays in boot time are present. The ROM may be configured with direct memory access (DMA) to the volatile memory of the microprocessor of image processor 312. DMA allows memory-to-memory transfer of data from the ROM to system memory of the image processor 312 independent of operation of a main controller of image processor 312. Providing DMA to this boot ROM further reduces the amount of time from power on of the image processor 312 until sensor data from the visible light camera 114 can be processed and stored. In some examples, minimal processing of the camera signal from the visible light camera 114 is performed by the image processor 312, and additional processing may be performed by applications operating on the mobile device 390 or server system 398.

Low-power circuitry 320 includes low-power processor 322 and low-power wireless circuitry 324. These elements of low-power circuitry 320 may be implemented as separate elements or may be implemented on a single IC as part of a system on a single chip. Low-power processor 324 includes logic for managing the other elements of the eyewear device 100. Low-power processor 324 is configured to receive input signals or instruction communications from mobile device 390 via low-power wireless connection 325. Additional details related to such instructions are described further below. Low-power wireless circuitry 324 includes circuit elements for implementing a low-power wireless communication system via a short-range network. Bluetooth™ Smart, also known as Bluetooth™ low energy, is one standard implementation of a low power wireless communication system that may be used to implement low-power wireless circuitry 324. In other examples, other low power communication systems may be used.

Figure 4:
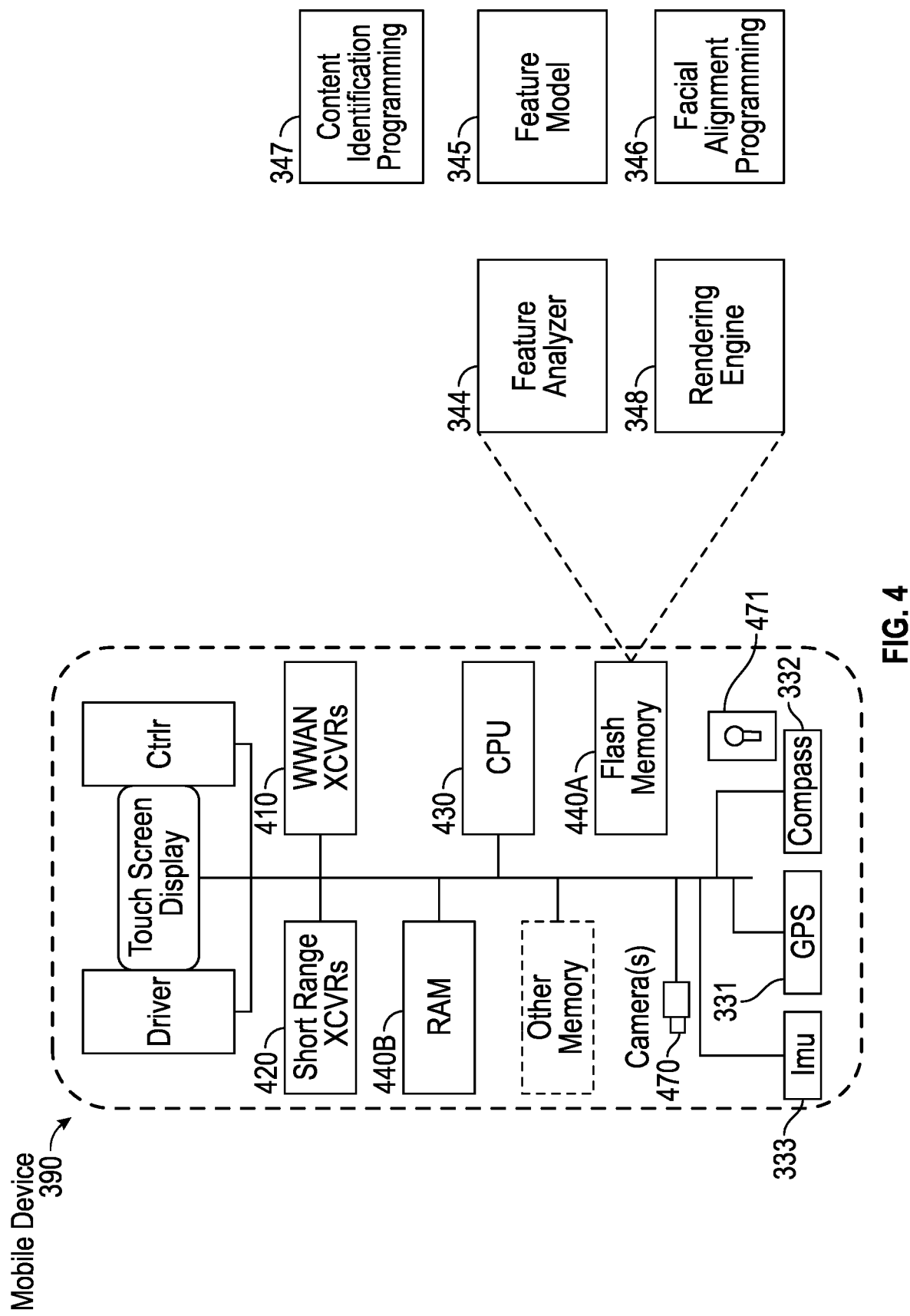
FIG. 4 is a simplified block diagram of a hardware configuration for the mobile device.

Mobile device 390 and elements of network 395, low-power wireless connection 325, and high-speed wireless architecture 337 may be implemented using details of the architecture of mobile device 390, for example utilizing the short range XCVRs and WWAN XCVRs of mobile device 390 described in FIG. 4.

Figure 3B:
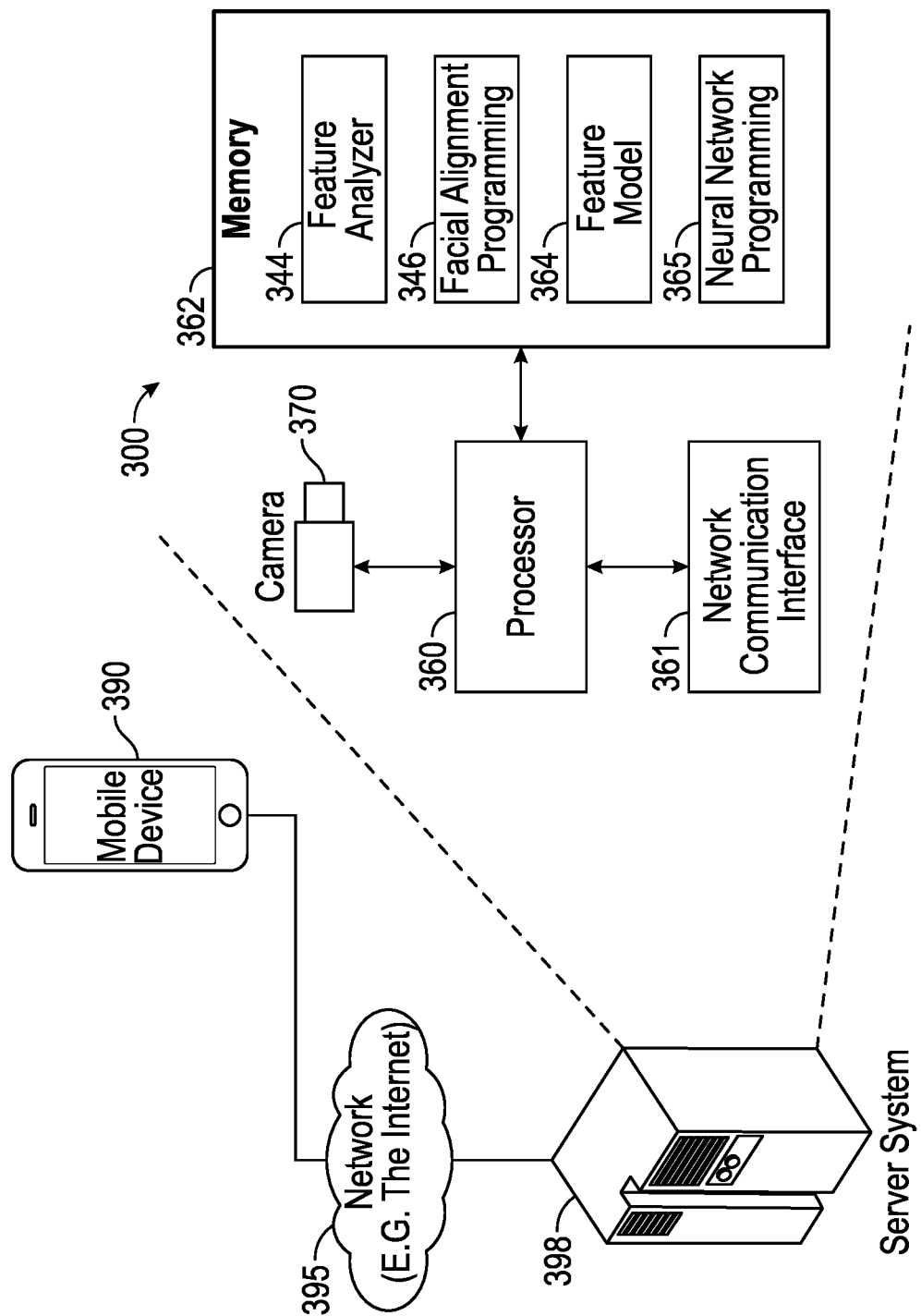
FIG. 3B is a simplified block diagram of an example of a hardware configuration for the server system of the audio visualizer system of FIG. 3A.

As shown in FIG. 3B, the server system 398 may be one or more computing devices as part of a service or network computing system, for example, that include a processor 360, a memory 362, and network communication interface 361 to communicate over the network 395 with the mobile device 390 and eyewear device 100. The memory 362 includes a feature model 364 and neural network programming 365. Execution of the neural network programming 365 by the processor 360 configures the server system 398 to perform some of the functions described herein.

In one example, the server system 398 receives, via the network 395, images of the scene from the eyewear device 100 via the mobile device 390, from the mobile device 390, or from other devices for use by the neural network programming 365 to train the feature model 364. The server system 398 sends the trained feature model to the eyewear device 100 or the mobile device 390 for use in identifying facial features, eyewear, covered facial regions, and uncovered facial regions. A suitable neural network is a convolutional neural network (CNN) based on one of the following architectures VGG16, VGG19, ResNet50, Inception V3, and Xception, or other CNN architectures.

In one example, machine learning techniques (e.g., deep learning) are used to locate objects in an image. Deep learning is a subset of machine learning that uses a set of algorithms to model high-level abstractions in data using a deep graph with multiple processing layers including linear and non-linear transformations. While many machine learning systems are seeded with initial features and network weights to be modified through learning and updating of the machine learning network, a deep learning network trains itself to identify "good" features for analysis. Using a multilayered architecture, machines employing deep learning techniques can process raw data better than machines using conventional machine learning techniques. Examining data for groups of highly correlated values or distinctive themes is facilitated using different layers of evaluation or abstraction.

CNNs are biologically inspired networks of interconnected data used in deep learning for detection, segmentation, and recognition of pertinent objects and regions in datasets. CNNs evaluate raw data in the form of multiple arrays, breaking the data in a series of stages, examining the data for learned features.

In one example, image analysis is carried out using a CNN. The CNN receives an input image and abstracts the image in a convolution layer to identify learned features. In a second convolution layer, the image is transformed into a plurality of images in which the learned features are each accentuated in a respective sub-image. The images are further processed to focus on the features of interest in the images. The resulting images are then processed through a pooling layer which reduces the size of the images to isolate portions of the images including the features of interest. Outputs of the convolutional neural network receive values from the last non-output layer and classify the image based on the data received from the last non-output layer.

The feature model 345 of the eyewear device 100 can be a mirror image of the feature model 364 of the server system 398. Feature model 345 of the eyewear device 100 is stored locally in a read-only memory (ROM), erasable programmable read-only memory (EPROM), or flash memory of high-speed circuitry 330.

FIG. 4 is a high-level functional block diagram of an example of a mobile device 390 that provides processing for the image capture, processing, and display system 300 of FIG. 3A. Shown are elements of a touch screen type of mobile device 390 having feature analyzer 344, feature model 345, facial alignment programming 346, and rendering engine 348 loaded along with other applications such as a chat application. Examples of touch screen type mobile devices that may be used include (but are not limited to) a smart phone, a personal digital assistant (PDA), a tablet computer, a laptop computer, or other portable device. However, the structure and operation of the touch screen type devices is provided by way of example; and the subject technology as described herein is not intended to be limited thereto. For purposes of this discussion, FIG. 4 therefore provides a block diagram illustration of the example mobile device 390 having a touch screen display for displaying content and receiving user input as (or as part of) the user interface. Mobile device 390 also includes a camera(s) 470, such as visible light camera(s), and a microphone 471.

As shown in FIG. 4, the mobile device 390 includes at least one digital transceiver (XCVR) 410, shown as WWAN XCVRs, for digital wireless communications via a wide area wireless mobile communication network. The mobile device 390 also includes additional digital or analog transceivers, such as short range XCVRs 420 for short-range network communication, such as via NFC, VLC, DECT, ZigBee, Bluetooth™, or WiFi. For example, short range XCVRs 420 may take the form of any available two-way wireless local area network (WLAN) transceiver of a type that is compatible with one or more standard protocols of communication implemented in wireless local area networks, such as one of the Wi-Fi standards under IEEE 802.11 and WiMAX.

To generate location coordinates for positioning of the mobile device 390, the mobile device 390 can include a global positioning system (GPS) receiver 331. Alternatively, or additionally the mobile device 390 can utilize either or both the short range XCVRs 420 and WWAN XCVRs 410 for generating location coordinates for positioning. For example, cellular network, WiFi, or Bluetooth™ based positioning systems can generate very accurate location coordinates, particularly when used in combination. Such location coordinates can be transmitted to the eyewear device 100 over one or more network connections via XCVRs 420. Additionally, mobile device 390 can include a compass 332 and an inertial measurement unit 333 for determining direction information.

The transceivers 410, 420 (network communication interfaces) conform to one or more of the various digital wireless communication standards utilized by modern mobile networks. Examples of WWAN transceivers 410 include (but are not limited to) transceivers configured to operate in accordance with Code Division Multiple Access (CDMA) and 3rd Generation Partnership Project (3GPP) network technologies including, for example and without limitation, 3GPP type 2 (or 3GPP2) and LTE, at times referred to as "4G." For example, the transceivers 410, 420 provide two-way wireless communication of information including digitized audio signals, still image and video signals, web page information for display as well as web related inputs, and various types of mobile message communications to/from the mobile device 390 for user authorization strategies.

The mobile device 390 further includes a microprocessor, shown as CPU 430. A processor is a circuit having elements structured and arranged to perform one or more processing functions, typically various data processing functions. Although discrete logic components could be used, the examples utilize components forming a programmable CPU. A microprocessor for example includes one or more integrated circuit (IC) chips incorporating the electronic elements to perform the functions of the CPU. The processor 430, for example, may be based on any known or available microprocessor architecture, such as a Reduced Instruction Set Computing (RISC) using an ARM architecture, as commonly used today in mobile devices and other portable electronic devices. Other processor circuitry may be used to form the CPU 430 or processor hardware in smartphone, laptop computer, and tablet.

The microprocessor 430 serves as a programmable host controller for the mobile device 390 by configuring the mobile device 390 to perform various operations, for example, in accordance with instructions or programming executable by processor 430. For example, such operations may include various general operations of the mobile device, as well as operations related to determining the location of the device when an image is captured and determining the location and orientation of the device when generating and presenting image overlays. Although a processor may be configured by use of hardwired logic, typical processors in mobile devices are general processing circuits configured by execution of programming.

The mobile device 390 includes a memory or storage device system, for storing data and programming. In the example, the memory system may include a flash memory 440A and a random access memory (RAM) 440B. The RAM 440B serves as short term storage for instructions and data being handled by the processor 430, e.g., as a working data processing memory. The flash memory 440A typically provides longer term storage.

Depending on the type of device, the mobile device 390 stores and runs a mobile operating system for executing specific applications, which may include feature analyzer 344, feature model 345, facial alignment programming 346, and rendering engine 348. However, in some implementations, programming may be implemented in firmware or a combination of firmware and an application layer. For example, the instructions to obtain images, identify features, analyze features, align facial features, and generate an overlay may reside in firmware (e.g., with a dedicated GPU or VPU SOC). Instructions to produce the visible output to the user may reside in an application. Applications, like the feature analyzer 344, the facial alignment programming 346, and other applications, may be a native application, a hybrid application, or a web application (e.g., a dynamic web page executed by a web browser) that runs on mobile device 390. Examples of mobile operating systems include Google Android, Apple iOS (I-Phone or iPad devices), Windows Mobile, Amazon Fire OS, RIM BlackBerry operating system, or the like.

FIGS. 5A, 5B, 5C, and 5D are flowcharts 500, 520, 540, and 560, respectively, illustrating example operation of an image processing device (e.g., an eyewear device 100, a mobile device 390, or another electronic device such as a personal computer capable of image processing) facial distortion in images due to eyewear lenses). The facial distortion is due to refraction caused by lens of eyewear, which is described with reference to FIGS. 6A and 6B. Illustrations of initial images and image correction using the described methods are depicted in FIGS. 7A-7D. Although shown as occurring serially, one or more of the blocks in flowcharts 500, 520, 540, or 560 may be reordered or parallelized depending on the implementation.

At block 502, the image processing device obtains an image including a face 700 (FIG. 7A) of a subject wearing eyewear 100. The image processing device may obtain the image from a camera of the device, from memory of the device, or from another device via a network connection. The image processing device may store the image in memory. In an example, obtaining the image includes capturing the image with a camera system of an eyewear device having an augmented reality optical assembly. In accordance with this example, a field of view of the camera system overlaps a field of view through the augmented reality optical assembly.

Figure 7A:
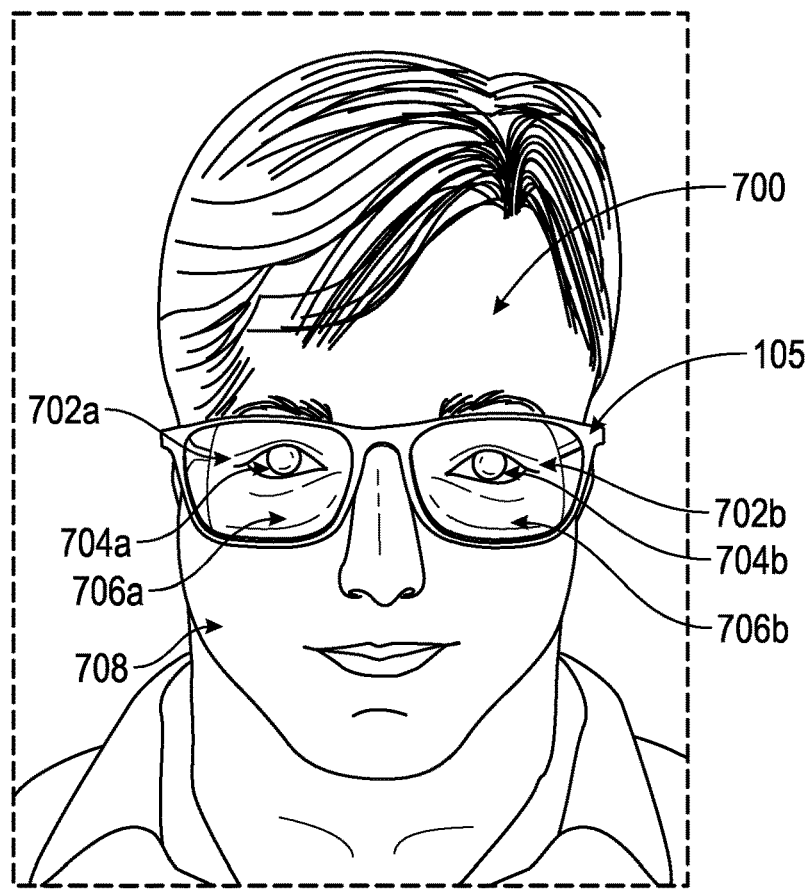
FIG. 7A is an illustration of an image in accordance with the prior art illustrating distortion introduced by eyewear.
Figure 7B:
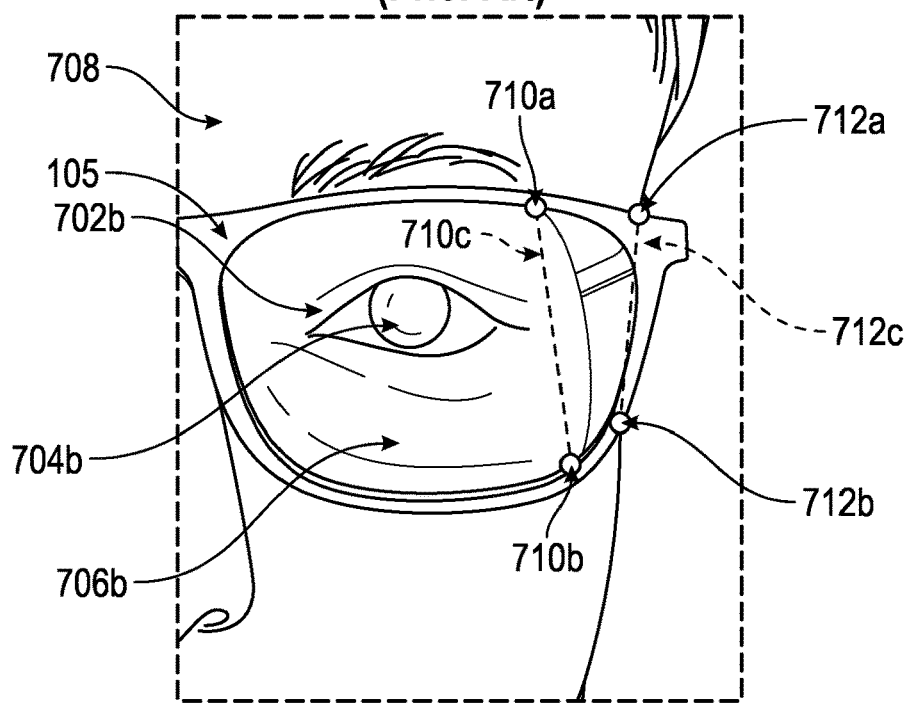
FIG. 7B is an illustration depicting an example step in the removal of distortion introduced by eyewear.
Figure 7C:
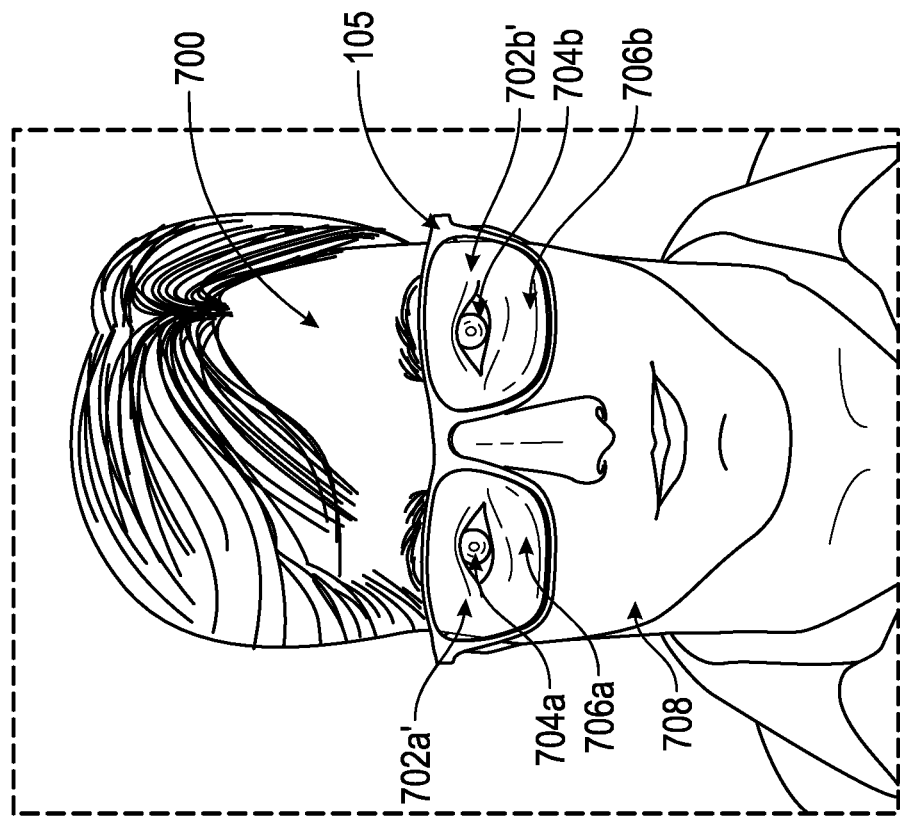
FIGS. 7C and 7D are illustrations of two resultant images with altered eyewear regions correcting for distortion introduced by eyewear.
Figure 7D:
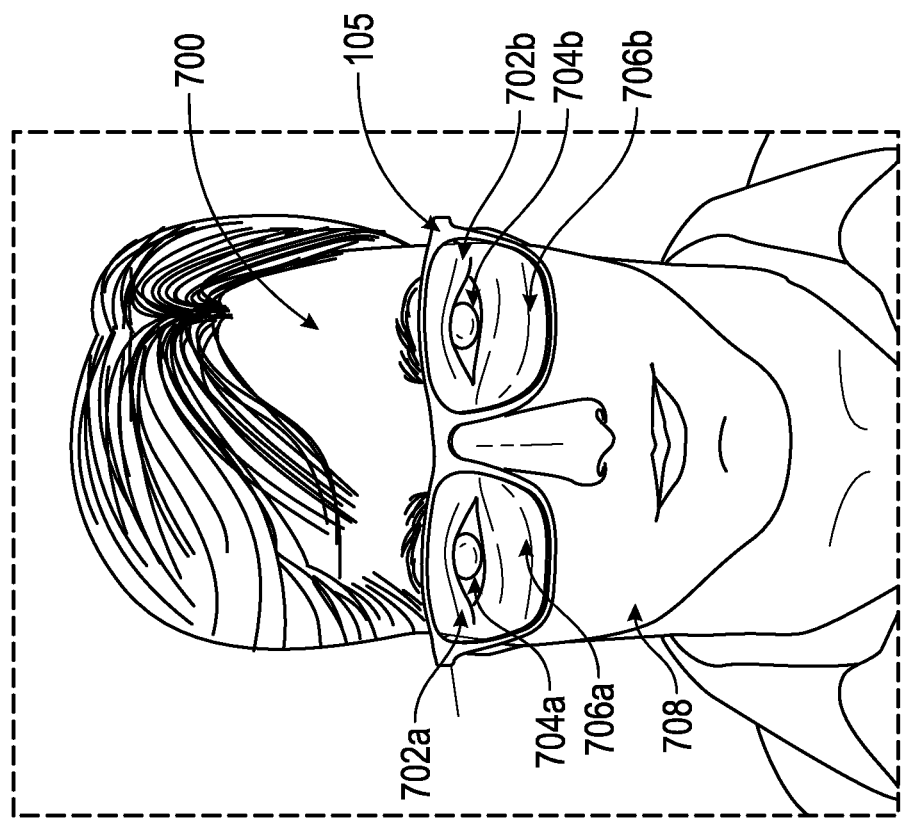

The eyewear 100 in the obtained image includes a lens 702 (right lens 702a and left lens 702b) defining a coverage area covering a region of the face surrounding an eye 704 (right eye 704a and left eye 704b) where the lens distorts the region of the face in the coverage area to produce a covered facial region 706 (right region 706a and left region 706b) within the coverage area of the lens. As illustrated in FIG. 7B, the covered facial region 706b has a covered facial boundary 710c between point 710a (where the edge of the covered face intersects with an upper edge of the lens) and 710b (where the edge of the covered face intersects with a lower edge of the lens) that is not aligned with an uncovered facial boundary 712c of the face outside the coverage area between point 712a (where the edge of the uncovered face intersects with an upper edge of the frame) and 712b (where the edge of the uncovered face intersects with a lower edge of the frame).

At block 504, the image processing device segments the obtained image to detect the face 700 and the coverage area of the lens. The image processing device may further identify the covered facial region (within the coverage area) during segmentation. In one example, segmenting is done using known computer vision or machine learning models (e.g., a CNN). The models may be trained using unannotated images or trained using hundreds or thousands or more annotated images. In one example, the annotations include pixel-accurate locations of foregrounds elements such as hair, glasses (lenses and frames, eyes, eyebrows, and skin. Detecting glasses and segmentation from images is described in Glasses Detection and Segmentation from Face Portrait Image Master's Thesis at the Graz University of Technology in Graz, Austria by Paul Urthaler (December 2008), which is incorporated fully herein by reference.

At block 506, the image processing device alters the covered facial region 706 within the detected coverage area of the lens 702 to match the covered facial boundary 710c to the uncovered facial boundary 712c. Three examples for altering the covered facial region are described in respective FIGS. 7B-7D.

At block 508, the image processing device displays the altered covered facial region. In an example, the processor 403 of the mobile device 390 displays the original image with the altered covered facial region on the touch screen display via a display driver. In another example, the processor 343 of the eyewear device 100 displays the altered coverage facial region on the image display 180 via the image processor 312 and image display driver 342. The altered coverage facial region may be presented on the face of an eyewear wearer being viewed via the eyewear device 100. In accordance with this example, the image processor 312 generates overlay images from the altered covered facial region and presents the overlay images on the augmented reality optical assembly within the detected coverage area of the lens.

In an example, the obtained image is one of a series of sequential images and the process described above with reference to blocks 502-508 is repeated for each subsequent image of the series of sequential images.

Figure 5A:
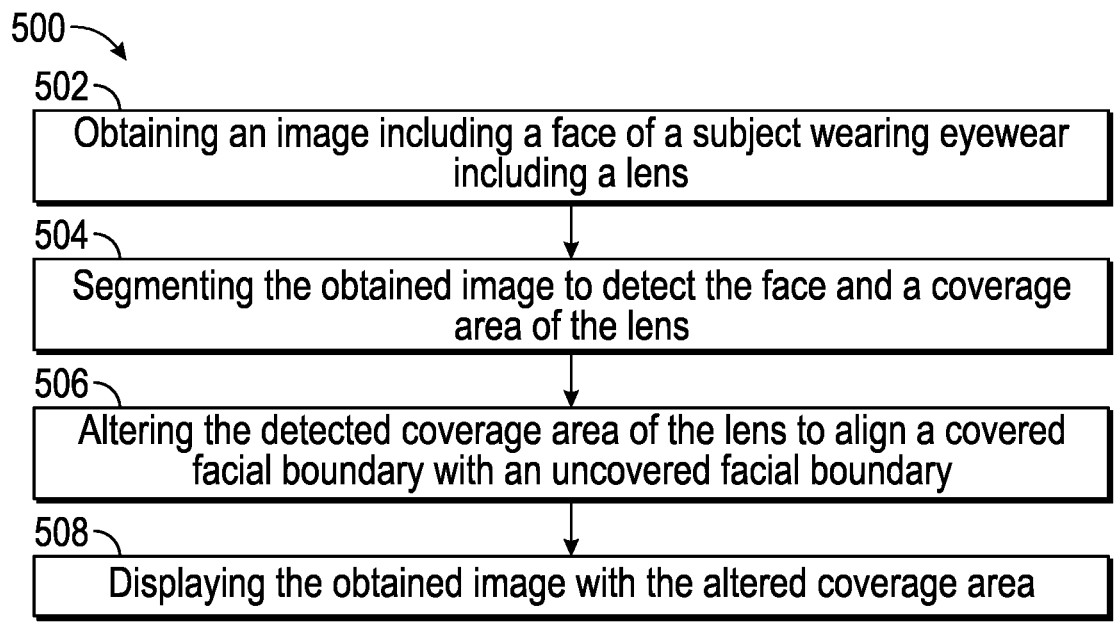
FIGS. 5A, 5B, 5C and 5D are flowcharts of example steps for removing distortion introduced by eyewear.
Figure 5B:
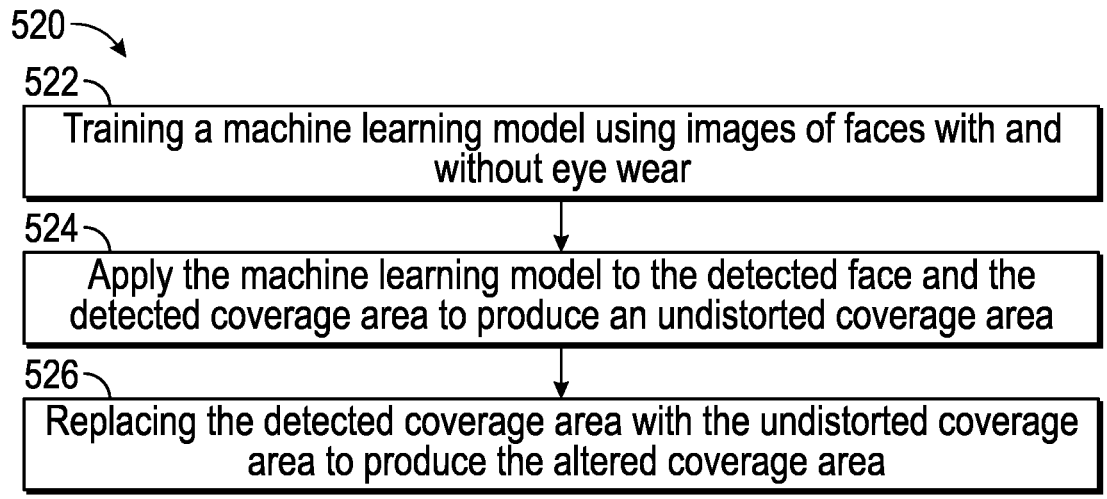

FIG. 5B depicts a flowchart 520 of example steps for altering the detected coverage area. At block 522, the server system 398 trains a machine learning model. In an example, the machine learning model is trained using a plurality of images with other faces with eyewear including lenses that distort the covered facial boundary and a corresponding plurality of images with the other faces with eyewear that does not distort the covered facial boundary. The images used for training may be annotated or unannotated.

At block 524, the image processing device applies the machine learning model. In an example, the detected covered facial region and the detected face are provided as inputs to the machine learning model, which produce the altered covered facial region as an output. The altered covered facial region is undistorted (see FIG. 7D).

At block 526, the image processing device replaces the covered facial region with the altered covered facial region. In an example, the processor 430 of the mobile device 390, via a driver of a touch screen display replaces the covered facial region with the altered covered facial region (see FIG. 7D). In another example, the processor 343 of the eyewear device 100 replaces the covered facial region using image processor 312 and image display driver 343.

Figure 5C:
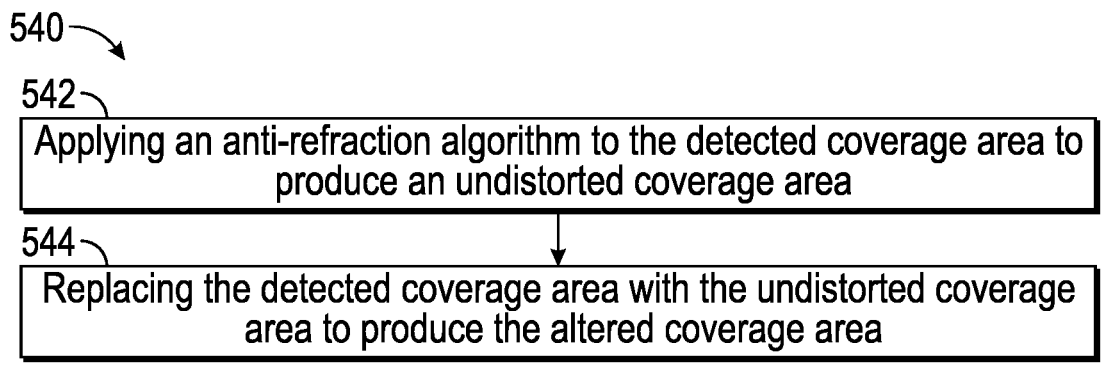

FIG. 5C depicts a flowchart 540 of other example steps for altering the detected coverage area.

At block 542, the image processing device applies an anti-refraction algorithm to the detected covered facial region to produce an altered covered facial region. The anti-refraction algorithm reverses the refraction described with reference to FIGS. 6A-C. Suitable anti-refraction algorithms will be understood by one of skill in the art from the description herein.

At block 544, the image processing device replaces the covered facial region with the altered covered facial region. In an example, the processor 430 of the mobile device 390, via a driver of a touch screen display replaces the covered facial region with the altered covered facial region. In another example, the processor 343 of the eyewear device 100 replaces the covered facial region using image processor 312 and image display driver 343.

Figure 5D:
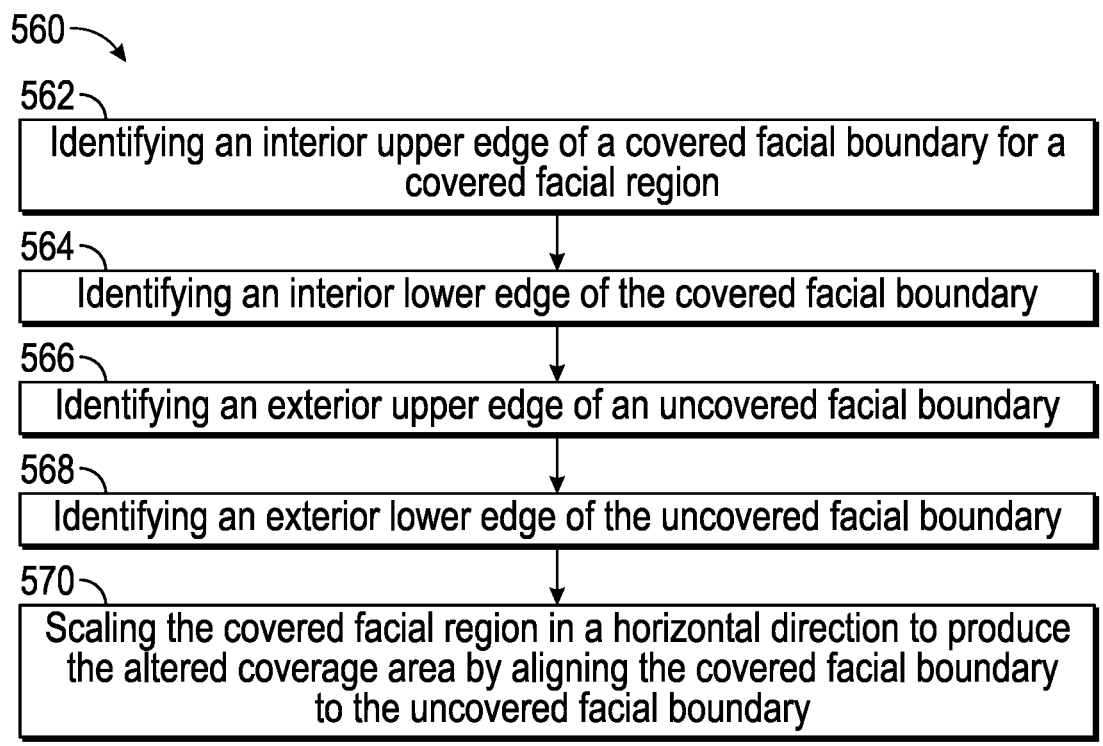

FIG. 5D depicts a flowchart 560 of other example steps for altering the detected coverage area.

At block 562, the image processing device identifies an interior upper edge 710a of the covered facial boundary 710c where the covered facial boundary intersects an upper edge of the lens. At block 564, the image processing device identifies an interior lower edge of the covered facial boundary where the covered facial boundary intersects a lower edge of the lens. At block 566, the image processing device identifies an exterior upper edge of the uncovered facial boundary where the uncovered facial boundary intersects an upper edge of the lens. At block 568, the image processing device identifies an exterior lower edge of the uncovered facial boundary where the uncovered facial boundary intersects a lower edge of the lens. In one example, the image processing device identifies the edges by applying a computer vision algorithm configured to identify edges. In another example, the image processing device identifies edges by applying a convolutional neural network configures to identify eyewear, covered facial boundaries, and uncovered facial boundaries.

At block 570, the image processing device scales the covered facial boundary in a horizontal direction until at least one of the interior upper edge matches the exterior upper edge or the interior lower edge matches the exterior lower edge. In an example, the image processing device scales the image by applying a linear or other polynomial level based stretching (see FIG. 7C) to the covered facial region.

Figure 6A:
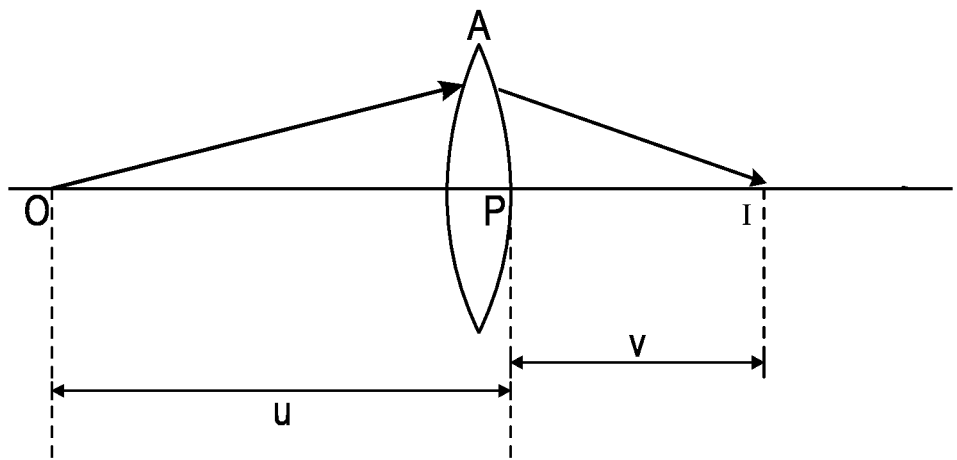
FIGS. 6A and 6B are prior art illustrations depicting image magnification due to lenses.

Referring now to FIG. 6A, the lens 702 is a thin lens made of a transparent material bounded by two spherical surfaces. As there are two spherical surfaces, there are two centers of curvature $C_1$ and $C_2$ and correspondingly two radii of curvature $R_1$ and $R_2$. The line joining the centers of curvature is called the principal axis of the lens. The center P of the thin lens, which lies on the principal axis is called the optic center.

Consider a thin lens made up of a medium of refractive index n2 placed in a medium of refractive index n1 (e.g., air). Let $R_1$ and $R_2$ be the radii of curvature of the ray entry surface and the ray exit surface, respectively, and P be the optic center.

Consider a point object O on the principal axis. The ray OP falls normally on the spherical surface and goes through the lens undeviated. The ray OA falls at A very close to P. The ray is refracted at the ray entry lens surface and the ray exit lens surface, forming a distorted version of the image at I.

The general equation for the refraction at a spherical surface is given by equation 1.

$$(n_2/v) - (n_1/u) = (n_2 - n_1)/R \qquad (1)$$

For a lens used in air, equation 1 can be used to derive the lens maker formula shown in equation 2.

$$\frac{1}{f} = (\mu - 1) * \left(\frac{1}{R_1} - \frac{1}{R_2}\right) \quad (2)$$

Figure 6B:
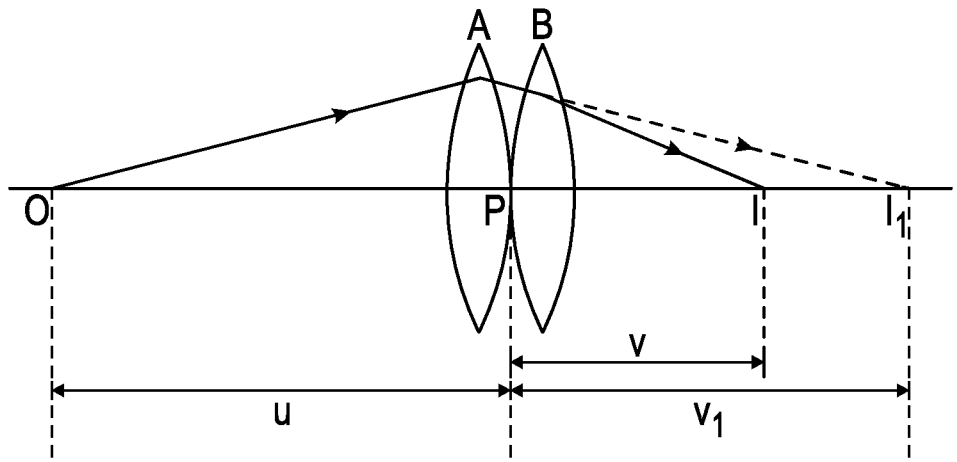

FIG. 6B depicts two lenses A and B. For two lenses A and B having focal length $f_1$ and $f_2$, respectively, placed in contact with each other. An object is placed at O beyond the focus of the first lens A on the common principal axis.

The lens A produces an image at Ii. This image Ii acts as the object for the second lens B. The final image is produced at I as shown in FIG. 6B. Since the lenses are thin, a common optical center P is chosen. In terms of power, the power of a combination of lenses in contact is the algebraic sum of the powers of individual lenses.

Figure 6C:
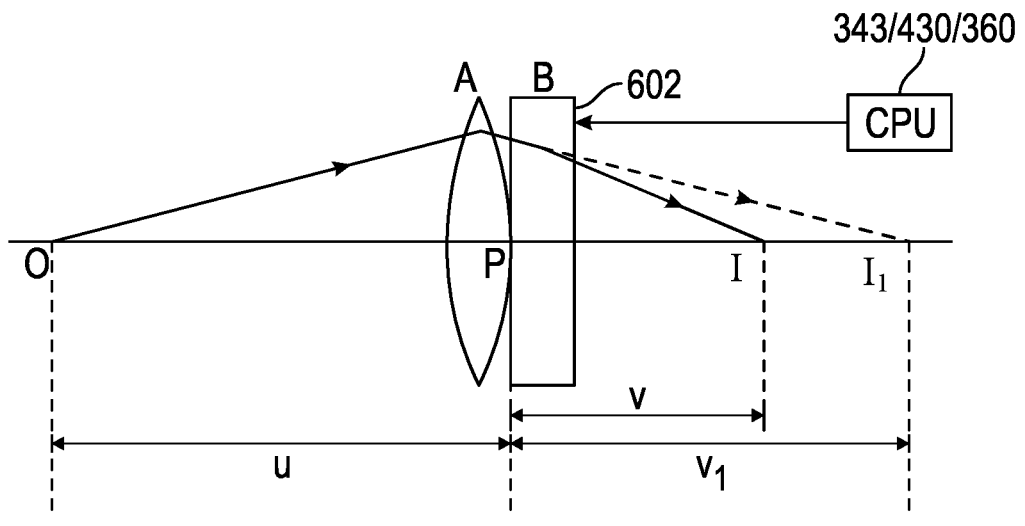
FIG. 6C is an illustration depicting a technique for removing distortion introduced by eyewear.

FIG. 6C depicts an image processor 312 in place of the second lens. The image processor 312 is configured to implement an anti-refraction algorithm that reverses the refraction introduced by the first lens. The anti-refraction algorithm may be an inverse of the lens maker's formula or other suitable algorithm for removing refraction introduced by a lens. The image processor 312 may be implemented using a processor of the eyewear 100, mobile device 390, or server system 398.

Any of the methods described herein such as the feature analyzer 344, the feature model 345, the facial alignment programming 346, and programming for the rendering engine 348 for the eyewear device 100, mobile device 390, and server system 398 can be embodied in one or more methods as method steps or in one or more applications as described previously. According to some examples, an "application," "applications," or "firmware" are program(s) that execute functions defined in the program, such as logic embodied in software or hardware instructions. Various programming languages can be employed to generate one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application can invoke application programming interface (API) calls provided by the operating system to facilitate functionality described herein. The applications can be stored in any type of computer readable medium or computer storage device and be executed by one or more general-purpose computers. In addition, the methods and processes disclosed herein can alternatively be embodied in specialized computer hardware or an application specific integrated circuit (ASIC), field programmable gate array (FPGA) or a complex programmable logic device (CPLD).

Program aspects of the technology may be thought of as "products" or "articles of manufacture" typically in the form of executable code and associated data that is carried on or embodied in a type of machine-readable medium. For example, programming code could include code for navigation, eye tracking or other functions described herein. "Storage" type media include any or all the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from the server system 398 or host computer of the service provider into the computer platforms of the eyewear device 100 and mobile device 390. Thus, another type of media that may bear the programming, media content or meta-data files includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to "non-transitory", "tangible", or "storage" media, terms such as computer or machine "readable medium" refer to any medium that participates in providing instructions or data to a processor for execution.

Hence, a machine-readable medium may take many forms of tangible storage medium. Non-volatile storage media include, for example, optical or magnetic disks, such as any of the storage devices in any computer(s) or the like, such as may be used to implement the client device, media gateway, transcoder, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and data. Many of these forms of computer readable media may be involved in carrying one or more sequences of one or more instructions to a processor for execution.

The scope of protection is limited solely by the claims that now follow. That scope is intended and should be interpreted to be as broad as is consistent with the ordinary meaning of the language that is used in the claims when interpreted considering this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A method for addressing facial distortion in images due to eyewear, the method comprising:
obtaining an image including a face of a subject wearing eyewear, the eyewear including a lens defining a coverage area covering a region of the face, the lens distorting the region of the face in the coverage area to produce a covered facial region within the coverage area of the lens, the covered facial region having a covered facial boundary that is not aligned with an uncovered facial boundary of the face outside the coverage area;
segmenting the obtained image to detect the face and the coverage area of the lens;
identifying a first interior edge location where the covered facial boundary intersects a first edge portion of the lens and a second interior edge location where the covered facial boundary intersects a second edge portion of the lens by applying a computer vision algorithm configured to identify edges;
identifying a first exterior edge location where the uncovered facial boundary intersects a third edge portion of the lens and a second exterior edge location where the uncovered facial boundary intersects a fourth edge portion of the lens by applying the computer vision algorithm; and
altering the covered facial region within the image by scaling the covered facial region in a horizontal direction until the first interior edge location, where the covered facial boundary intersects the first edge portion of the lens, matches the first exterior edge location, where the uncovered facial boundary intersects the third edge portion of the lens, and the second interior edge location, where the covered facial boundary intersects the second edge portion of the lens, matches the second exterior edge location, where the uncovered facial boundary intersects the fourth edge portion of the lens.

2. The method of claim 1, further comprising:
displaying the obtained image with the altered covered facial region.

3. The method of claim 2, wherein the image is one of a series of sequential images and the method further comprises, for each subsequent image of the series of sequential images:
segmenting the subsequent image to detect the face and the coverage area of the lens;
altering the covered facial region within the detected coverage area of the lens to match the covered facial boundary to the uncovered facial boundary; and
displaying the subsequent image with the altered covered facial region.

4. The method of claim 1, wherein the first interior edge location is a position adjacent an upper interior edge of the covered facial boundary, the second interior edge location is a position adjacent a lower interior edge of the covered facial boundary, the first exterior edge location is a position adjacent an upper exterior edge of the uncovered facial boundary, and the second exterior edge location is a position adjacent a lower exterior edge of the uncovered facial boundary.

5. The method of claim 1, wherein the scaling applies polynomial stretching to the covered facial region.

6. The method of claim 1, wherein the segmenting further comprises identifying the covered facial region.

7. The method of claim 1, wherein the obtaining comprises obtaining the image from a camera system of an eyewear device having an augmented reality optical assembly, a field of view of the camera system overlapping a field of view through the augmented reality optical assembly, and wherein the method further comprises:
generating at least one overlay image from the altered covered facial region; and
presenting the at least one overlay image on the augmented reality optical assembly within the detected coverage area of the lens.

8. A system for addressing facial distortion in images due to eyewear, the system comprising:
an image capture device configured to obtain an image including a face of a subject wearing eyewear, the eyewear including a lens defining a coverage area covering a region of the face, the lens distorting the region of the face in the coverage area to produce a covered facial region within the coverage area of the lens, the covered facial region having a covered facial boundary that is not aligned with an uncovered facial boundary of the face outside the coverage area; and a processor coupled to the image capture device, the processor configured to segment the obtained image to detect the face and the coverage area of the lens, identify a first interior edge location, where the covered facial boundary intersects a first edge portion of the lens, and a second interior edge location, where the covered facial boundary intersects a second edge portion of the lens, by applying a computer vision algorithm configured to identify edges, identify a first exterior edge location, where the uncovered facial boundary intersects a third edge portion of the lens, and a second exterior edge of the uncovered facial boundary, where the uncovered facial boundary intersects a fourth edge portion of the lens by applying the computer vision algorithm, and alter the covered facial region within the image by scaling the covered facial region in a horizontal direction until the first interior edge location, where the covered facial boundary intersects the first edge portion of the lens, matches the first exterior edge location, where the uncovered facial boundary intersects the third edge portion of the lens, and the second interior edge location, where the covered facial boundary intersects the second edge portion of the lens, matches the second exterior edge location, where the uncovered facial boundary intersects the fourth edge portion of the lens.

9. The system of claim 8, further comprising:
a display coupled to the processor, the display configured to display the obtained image with the altered covered facial region.

10. The system of claim 8, wherein the first interior edge location is a position adjacent an upper interior edge of the covered facial boundary, the second interior edge location is a position adjacent a lower interior edge of the covered facial boundary, the first exterior edge location is a position adjacent an upper exterior edge of the uncovered facial boundary, and the second exterior edge location is a position adjacent a lower exterior edge of the uncovered facial boundary.

11. The system of claim 8, wherein, to scale the covered facial region, the processor is configured to apply polynomial stretching to the covered facial region.

12. The system of claim 8, wherein the processor is further configured to segment the obtained image to identify the covered facial region.

13. The system of claim 8, further comprising:
an eyewear device having a camera system for obtaining the image and an augmented reality optical assembly, a field of view of the camera system overlapping a field of view through the augmented reality optical assembly;
wherein the processor is further configured to generate at least one overlay image from the altered covered facial region and present the at least one overlay image on the augmented reality optical assembly within the detected coverage area of the lens.

14. The system of claim 8, wherein the image is one of a series of sequential images and wherein the processor is configured to, for each subsequent image of the series of sequential images, segment the subsequent image to detect the face and the coverage area of the lens and alter the covered facial region within the detected coverage area of the lens to match the covered facial boundary to the uncovered facial boundary.

15. A non-transitory computer-readable medium for addressing facial distortion in images due to eyewear, the non-transitory computer-readable medium comprising instructions that, when performed by a processor, configure the processor to performed functions, including functions to:
obtain an image including a face of a subject wearing eyewear, the eyewear including a lens defining a coverage area covering a region of the face, the lens distorting the region of the face in the coverage area to produce a covered facial region within the coverage area of the lens, the covered facial region having a covered facial boundary that is not aligned with an uncovered facial boundary of the face outside the coverage area;
segment the obtained image to detect the face and the coverage area of the lens;
identify a first interior edge location, where the covered facial boundary intersects a first edge portion of the lens, and a second interior edge location, where the covered facial boundary intersects a second edge portion of the lens, by applying a computer vision algorithm configured to identify edges;
identify a first exterior edge location, where the uncovered facial boundary intersects a third edge portion of the lens, and a second exterior edge of the uncovered facial boundary, where the uncovered facial boundary intersects a fourth edge portion of the lens, by applying the computer vision algorithm configured to identify edges; and
alter the covered facial region within the image by scaling the covered facial region in a horizontal direction until the first interior edge location, where the covered facial boundary intersects the first edge portion of the lens, matches the first exterior edge location, where the uncovered facial boundary intersects the third edge portion of the lens, and the second interior edge location, where the covered facial boundary intersects the second edge portion of the lens, matches the second exterior edge location, where the uncovered facial boundary intersects the fourth edge portion of the lens.

16. The non-transitory computer-readable medium of claim 15, wherein the instructions further configure the processor to perform functions to:
display the obtained image with the altered covered facial region.

17. The non-transitory computer-readable medium of claim 15, wherein the first interior edge location is a position adjacent an upper interior edge of the covered facial boundary, the second interior edge location is a position adjacent a lower interior edge of the covered facial boundary, the first exterior edge location is a position adjacent an upper exterior edge of the uncovered facial boundary, and the second exterior edge location is a position adjacent a lower exterior edge of the uncovered facial boundary.

18. The non-transitory computer-readable medium of claim 15, wherein, to scale the covered facial region, the instructions further configure the processor to apply polynomial stretching to the covered facial region.

19. The non-transitory computer-readable medium of claim 15, wherein the instructions further configure the processor to segment the obtained image to identify the covered facial region.

20. The non-transitory computer-readable medium of claim 15, wherein the image is one of a series of sequential images and wherein the instructions further configure the processor to perform functions to, for each subsequent image of the series of sequential images, segment the subsequent image to detect the face and the coverage area of the lens and alter the covered facial region within the detected coverage area of the lens to match the covered facial boundary to the uncovered facial boundary.

* * * * *